United States Patent [19]
Mendes et al.

[11] Patent Number: 5,394,788
[45] Date of Patent: Mar. 7, 1995

[54] HEAD FOR ARTICULATED PISTON

[75] Inventors: Jose A. C. Mendes; Jose M. M. Leites; Andre Lippai, all of Sao Paulo, Brazil

[73] Assignee: Metal Leve S/A Industria e Comercio, Sao Paulo, Brazil

[21] Appl. No.: 191,012

[22] Filed: Feb. 1, 1994

Related U.S. Application Data

[60] Division of Ser. No. 3,841, Jan. 11, 1993, Pat. No. 5,309,818, which is a continuation of Ser. No. 777,900, Oct. 17, 1991.

[30] Foreign Application Priority Data

Oct. 18, 1990 [BR] Brazil ................... 9005370

[51] Int. Cl.$^6$ .................................. F01B 31/08
[52] U.S. Cl. ........................ 92/176; 92/189; 92/219
[58] Field of Search .............. 92/176, 189, 190, 216, 92/217, 219; 123/193.6

[56] References Cited

U.S. PATENT DOCUMENTS

| | | | |
|---|---|---|---|
| 3,385,175 | 5/1968 | Meier et al. | 92/176 |
| 3,613,521 | 10/1971 | Itano | 29/888.044 |
| 3,616,729 | 11/1971 | Fischer | 92/176 |
| 3,628,511 | 12/1971 | Fischer | 92/176 |
| 4,083,292 | 4/1978 | Goloff | 92/176 |
| 4,356,800 | 11/1982 | Moebus | 92/216 |
| 4,553,472 | 11/1985 | Munro et al. | 92/176 |
| 5,065,508 | 11/1991 | Lorento et al. | |
| 5,081,968 | 1/1992 | Bruni | 92/217 |

FOREIGN PATENT DOCUMENTS

| | | | |
|---|---|---|---|
| 2038022 | 2/1972 | Germany | 123/193.6 |
| 3303984 | 5/1984 | Germany | 123/193.6 |
| 2122116 | 1/1984 | United Kingdom | 29/888.044 |
| 2129523 | 5/1984 | United Kingdom | 92/219 |
| 0791983 | 1/1981 | U.S.S.R. | 123/193.6 |

Primary Examiner—Thomas E. Denion
Attorney, Agent, or Firm—Darby & Darby

[57] ABSTRACT

A cooled piston head and method of manufacture, the piston head having a closed cooling chamber. In one embodiment, the piston head is formed of a top member, an intermediate member and a pin boss member joined to each other preferably by welding; the top and intermediate members are provided with circumferential grooves which defines the closed cooling chamber. In an alternate embodiment, the head is formed of a top member and a pin boss member joined together preferably by welding; the closed cooling chamber is defined by circumferential grooves provided on both members.

11 Claims, 3 Drawing Sheets

HEAD FOR ARTICULATED PISTON

This is a division of application Ser. No. 08/003,841, filed Jan. 11, 1993, now U.S. Pat. No. 5,309,818, which was a continuation of application Ser. No. 07/777,900, filed Oct. 17, 1991.

BACKGROUND OF THE INVENTION

The present invention relates to a piston head and the method for manufacturing particularly an articulated, or two-piece, piston head provided with a closed cooling chamber on its top portion.

Closed cooling chambers of pistons of the prior art, including articulated pistons, can be made by the gravity casting method only. However, this method has proven to be inadequate for making articulated piston heads since the product may lack the structural strength required to withstand the high thermal and mechanical loads imposed to the piston head top portion during the combustion process.

In the known articulated pistons the cooling chamber is of the so-called semi-open type, which is defined by a groove on the underside of the top and a tray provided on the skirt upper portion. In such cooling chambers, the cooling medium is supplied to the chamber by a nozzle, located at the engine crankcase, and circulates in the chamber. Due to the reciprocating motion of the piston the cooling medium splashes against the combustion bowl lower wall and the ring zone inner wall, thereby removing part of the heat generated in said regions.

However, for certain applications it is desirable to maintain the cooling medium for a longer period of time inside the cooling chamber, which not only increases the efficiency of the cooling process but also makes possible using substantially smaller quantities of cooling medium (engine lubricating oil), thus requiring an oil pump with a lower output.

OBJECT OF THE INVENTION

Therefore, it is an object of the present invention to provide a piston head and a method to manufacture a piston head, particularly an articulated piston head, having a closed cooling chamber, as well as the piston head thus obtained.

BRIEF DESCRIPTION OF THE INVENTION

The invention relates to a cooled piston head having a closed cooling chamber. In one embodiment, the piston head is formed of a top member, an intermediate member and a pin boss member joined to each other, such as by welding. The top and intermediate members are provided with circumferential grooves which define the closed cooling chamber. In an alternate embodiment, the head is formed of a top member and a pin boss member joined together, such as by welding. The closed cooling chamber is defined by circumferential grooves provided on both members.

BRIEF DESCRIPTION OF THE DRAWINGS

The invention will be hereinafter described with reference to the accompanying drawings wherein.

DETAILED DESCRIPTION OF THE INVENTION

Figure 1:
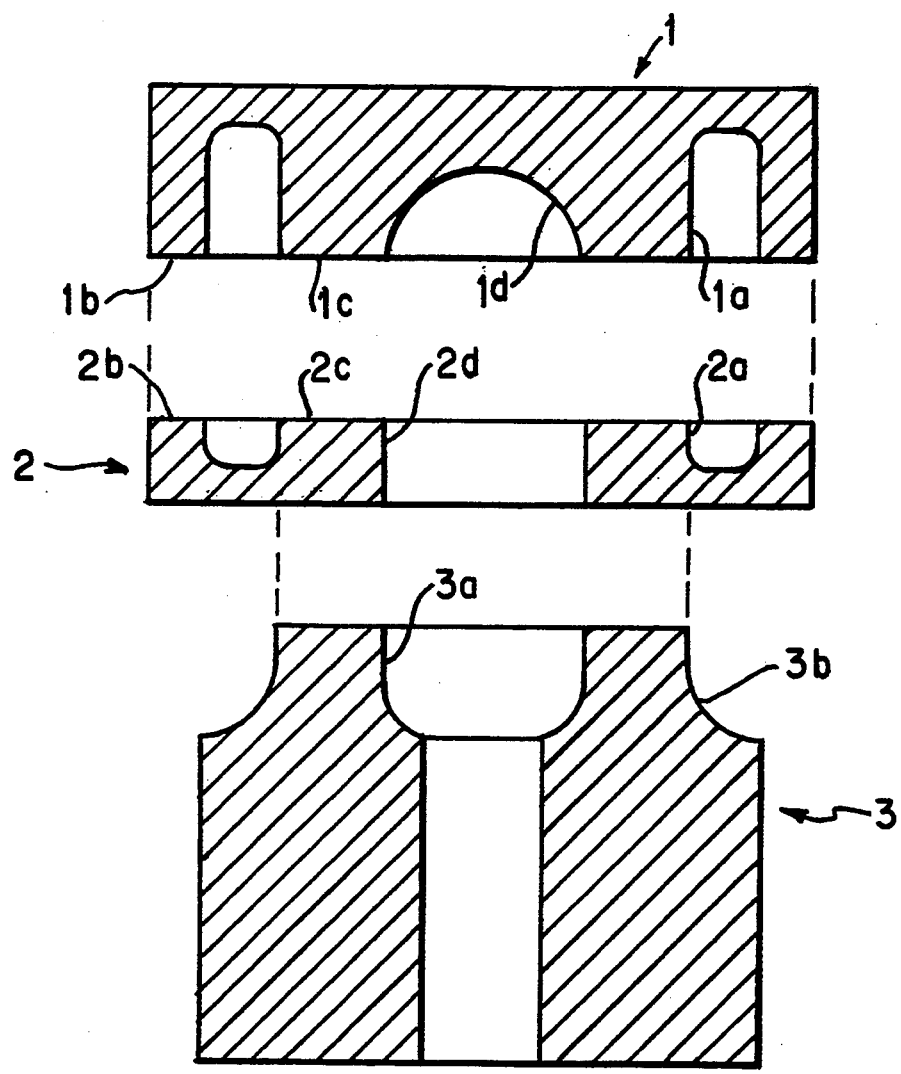
FIG. 1 is a longitudinal section view of a preferred embodiment in which the piston head of the present invention is made from three preformed blanks.

In one embodiment of the invention shown in FIG. 1, a first preformed top member 1 is provided with a circumferential groove 1a and a central recess 1d. A second intermediate preformed member 2 is provided with a circumferential groove 2a and a through hole 2d. A third pin boss preformed member 3 is provided with a central recess 3a and a peripheral recess 3b.

Each of the members 1, 2 and 3 is preferably made from blanks which are produced from billets of suitable steel material. The blanks are machined by any suitable process to form the various grooves and openings.

The top member 1 and the intermediate member 2 are joined together preferably by welding, after juxtaposing walls 1b and 2b and ribs 1c and 2c. Members 1 and 2 joined to each other are then joined such as by welding, to the pin boss member 3, whereby the rough piston head 4 of FIG. 3 is obtained.

In this embodiment, the cooling chamber cc is defined by the juxtaposition of the open ends of the oppositely facing circumferential groove 1a of the top member 1 and the circumferential groove 2a of the intermediate member 2.

Figure 2:
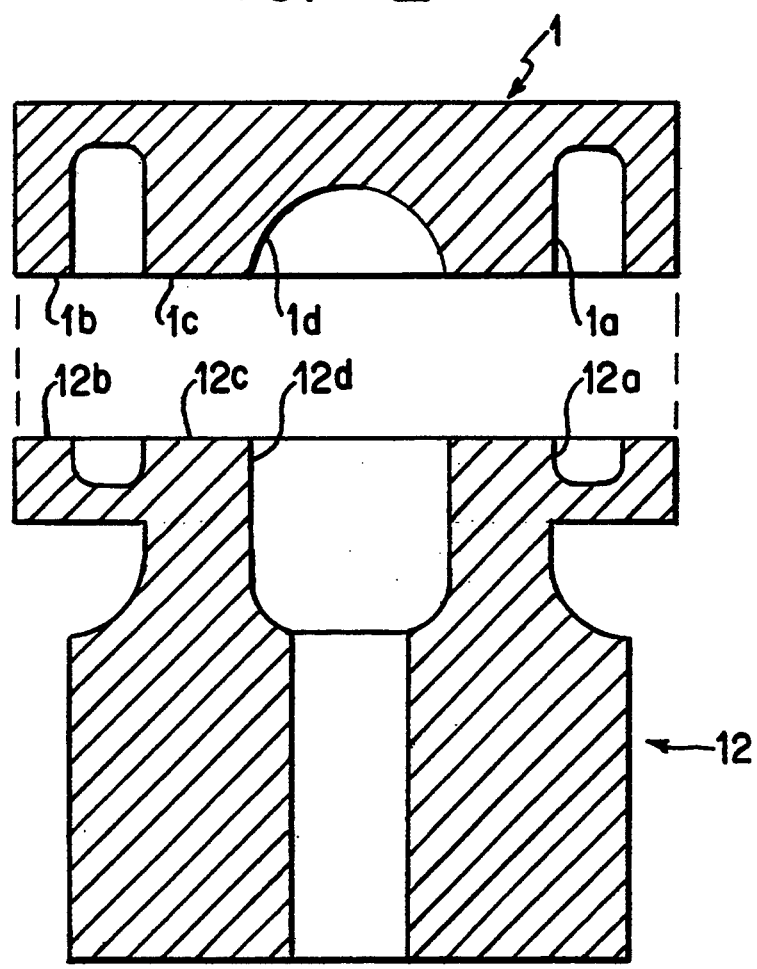
FIG. 2 is a longitudinal cross-section view of an alternate embodiment according to which the piston head of the invention is made from two preformed blanks.

In an alternate embodiment of the invention as seen in FIG. 2, a top preformed member 1 is provided with a circumferential groove 1a and a central recess 1d as in FIG. 1. A pin boss preformed member 12 is provided with a circumferential groove 12a and central recess 12d. Thereafter, the top member 1 is joined, such as by welding, to the pin boss member 12 by the juxtaposition of walls 1b and 12b and the ribs 1c and 12c. The same type of head 4 of FIG. 3 is obtained as is obtained with FIG. 1.

Figure 3:
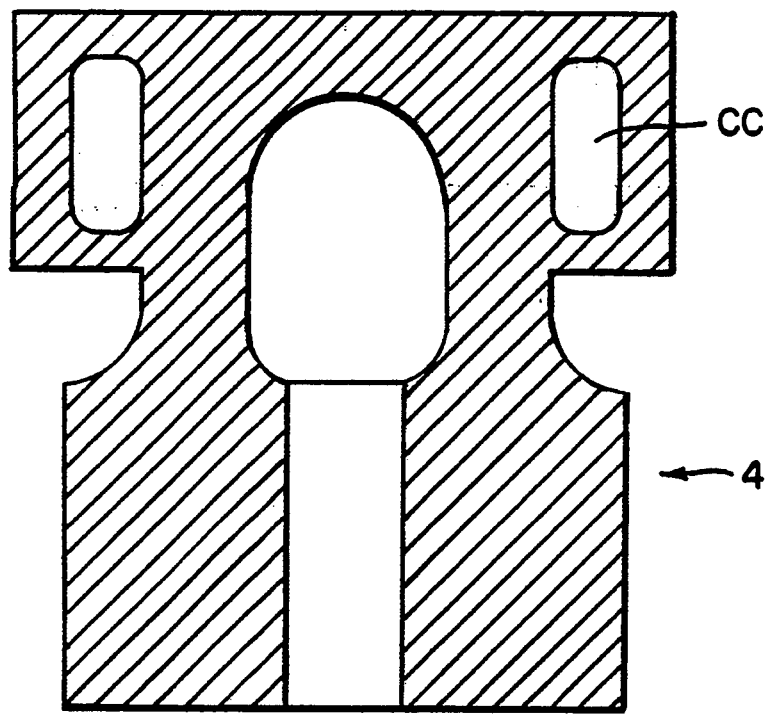
FIG. 3 is a longitudinal section view of the piston head obtained from the blanks shown on FIGS. 1 and 2 and according to the method of the invention.

In this alternate embodiment of FIG. 2, as shown in FIG. 3, the closed cooling chamber cc is defined by the juxtaposition of the open ends of the circumferential groove 1a of the top member 1 and the circumferential groove 12a of the pin boss member 12. The parts can be made in the same manner as previously described.

In subsequent operations, the rough head 4 is subjected to final machining to final dimensions and the provision of the ring grooves and the pin boss holes. These operations are neither described nor illustrated for they are not a material aspect of the present invention.

The preferred method for carrying out the present invention is the friction welding process, however, other welding processes known in the art can be employed as well. Forging and sintering also can be used.

While disclosing and illustrating two embodiments, it should be appreciated that other embodiments, it should be appreciated that other embodiments may be within the scope of the invention without departing from the spirit of the invention.

What is claimed is:

1. A cooled head for a two piece piston comprising: a first blank having an annular groove and a central recess on one face thereof defining a rib between said groove and said central recess and an outer circumferential wall surrounding said groove; and a second blank having an annular groove on one face and a central aperture therethrough defining a rib between said groove and said central aperture and an outer circumferential wall surrounding said groove;

said first and second blanks joined together with the ribs and said outer walls juxtaposed and grooves facing each other to define a closed cooling chamber.

2. A head for a piston as in claim 1 wherein said second blank further comprises a pin boss portion extending from the outer face of said second blank and having a continuation of said central aperture therethrough.

3. A head for a piston as in claim 2, wherein said second blank is a unitary structure.

4. A head on a piston as in claim 1 wherein said second blank is an intermediate member, and a pin boss portion having a central through passage joined to an outer face of said second blank with said central through passage with the centrals aperture of said second blank.

5. A head for a piston as in claim 1 wherein said first and second blanks are welded together.

6. A head for a piston as in claim 1 wherein said first and second blanks are joined in the juxtaposed areas of their respective ribs and outer circumferential walls.

7. A head for a piston as in claim 6 wherein said first and second blanks are welded in the joined areas.

8. A head for a piston head as in claim 4 wherein said first and second blanks are welded together in said pin boss portion welded to the outer face of said second blank.

9. A head for a piston as in claim 5, wherein the weld is a friction weld.

10. A head for a piston as in claim 7, wherein the weld is a friction weld.

11. A head for a piston as in claim 8 wherein the weld is a friction weld.

* * * * *